United States Patent
Cho et al.

(10) Patent No.: US 10,356,705 B2
(45) Date of Patent: Jul. 16, 2019

(54) METHOD FOR LOCATION AREA UPDATE IN MULTI-RAT ENVIRONMENT AND METHOD FOR TRANSMITTING/RECEIVING PAGING INFORMATION

(71) Applicant: LG Electronics Inc., Seoul (KR)

(72) Inventors: Heejeong Cho, Seoul (KR); Hyunsoo Ko, Seoul (KR); Eunjong Lee, Seoul (KR); Sunam Kim, Seoul (KR); Hyeyoung Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 88 days.

(21) Appl. No.: 14/916,326

(22) PCT Filed: Aug. 25, 2014

(86) PCT No.: PCT/KR2014/007867
§ 371 (c)(1),
(2) Date: Mar. 3, 2016

(87) PCT Pub. No.: WO2015/034195
PCT Pub. Date: Mar. 12, 2015

(65) Prior Publication Data
US 2016/0198400 A1 Jul. 7, 2016

Related U.S. Application Data

(60) Provisional application No. 61/873,799, filed on Sep. 4, 2013, provisional application No. 61/890,325, filed
(Continued)

(51) Int. Cl.
*H04W 48/18* (2009.01)
*H04W 8/08* (2009.01)
(Continued)

(52) U.S. Cl.
CPC .......... *H04W 48/18* (2013.01); *H04W 8/08* (2013.01); *H04W 68/02* (2013.01); *H04W 88/06* (2013.01); *H04W 60/00* (2013.01)

(58) Field of Classification Search
CPC ....... H04W 48/18; H04W 8/08; H04W 68/02; H04W 88/06; H04W 60/00
See application file for complete search history.

(56) References Cited

U.S. PATENT DOCUMENTS 8,812,050 B1 * 8/2014 Bencheikh ............ H04W 36/32
370/331
2005/0272449 A1 * 12/2005 Gallagher ............. H04W 36/14
455/458
(Continued)

FOREIGN PATENT DOCUMENTS

KR 1020050090969 9/2005

OTHER PUBLICATIONS

Hannu Hietalahti, "3GPP Core Network Evolution & Terminals," 3GPP, Jun. 2010, see p. 24, lines 1-14, p. 27, lines 1-8.

*Primary Examiner* — Christopher M Crutchfield
*Assistant Examiner* — Tito Q Pham
(74) *Attorney, Agent, or Firm* — Dentons US LLP

(57) ABSTRACT

The present invention relates to a method for updating a TAC in a multi-RAT environment and a method for transmitting/receiving paging information. A terminal, which is capable of establishing a radio connection through a first radio interface by a first radio protocol and a radio connection through a second radio interface by a second radio protocol, may determine the best radio interface on the basis of predetermined conditions, perform a TA update through the best radio connection interface, and transmit/receive paging information through the best radio connection interface.

9 Claims, 17 Drawing Sheets

Related U.S. Application Data on Oct. 14, 2013, provisional application No. 61/896,641, filed on Oct. 28, 2013, provisional application No. 61/900,402, filed on Nov. 6, 2013, provisional application No. 61/976,502, filed on Apr. 8, 2014.

(51) Int. Cl.
*H04W 68/02* (2009.01)
*H04W 88/06* (2009.01)
*H04W 60/00* (2009.01)

(56) References Cited

U.S. PATENT DOCUMENTS

| | | | | |
|---|---|---|---|---|
| 2009/0274121 | A1* | 11/2009 | Bertorelle | H04W 48/18 370/331 |
| 2011/0189997 | A1 | 8/2011 | Tiwari et al. | |
| 2012/0120789 | A1 | 5/2012 | Ramachandran et al. | |
| 2012/0294203 | A1* | 11/2012 | Koorapaty | H04L 1/0002 370/280 |
| 2012/0307735 | A1* | 12/2012 | Aghili | H04W 36/0022 370/328 |
| 2014/0211771 | A1* | 7/2014 | Kim | H04W 84/12 370/338 |
| 2014/0335861 | A1* | 11/2014 | De Benedittis | H04W 36/0061 455/436 |

\* cited by examiner

METHOD FOR LOCATION AREA UPDATE IN MULTI-RAT ENVIRONMENT AND METHOD FOR TRANSMITTING/RECEIVING PAGING INFORMATION

This application is a 35 USC § 371 National Stage entry of International Application No. PCT/KR2014/007867 filed Aug. 25, 2014, and claims priority to U.S. Provisional Application Nos. 61/873,799 filed Sep. 4, 2013; 61/890,325 filed Oct. 14, 2013; 61/896,641 filed Oct. 28, 2013; 61/900,402 filed Nov. 6, 2013 and 61/976,502 filed Apr. 8, 2014, all of which are hereby incorporated by reference in their entireties as if fully set forth herein.

BACKGROUND OF THE INVENTION

Field of the Invention

The present invention relates to wireless communications, and more particularly, to a method for updating a location area and a method for transmitting and receiving paging information in a communication environment in which a plurality of wireless networks are supported.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

FIG. 1 is a schematic diagram illustrating a structure of evolved mobile communication network.

As shown in FIG. 1, an evolved UMTS terrestrial radio access network (E-UTRAN) is connected to an evolved packet core (EPC).

The E-UTRAN includes base stations (or eNodeBs) 20 that provides a control plane and a user plane to a user equipment (UE). The base stations (or eNodeBs) 20 may be interconnected through an X2 interface.

The radio interface protocol layers between the UE and the base station (or eNodeB) 20 may be divided by L1 (a first layer), L2 (a second layer) and L3 (a third layer) based on lower three layers of open system interconnection (OSI) standard model that is widely known in communication systems. Among these layers, a physical layer included in the first layer provides an information transfer service using a physical channel, and a radio resource control (RRC) layer located at the third layer performs a role of controlling radio resources between the UE and the base station. For this, the RRC layer exchanges a RRC message between the UE and the base station.

Meanwhile, the EPC may include various elements. FIG. 1 shows a mobility management entity (MME) 51, a serving gateway (S-GW) 52, a packet data network gateway (PDN GW) 53 and a home subscriber server (HSS) 54 among the various elements.

The base station (or eNodeB) 20 is connected to the mobility management entity (MME) 51 of the EPC through an S1 interface, and is connected to the serving gateway (S-GW) 52 through an S1-U.

The S-GW 52 is an element that operates at a boundary point between a radio access network (RAN) and a core network and has a function of maintaining a data path between an eNodeB 20 and the PDN GW 53. Furthermore, if a user equipment (UE) moves in a region in which service is provided by the eNodeB 20, the S-GW 52 plays a role of a local mobility anchor point. That is, for mobility within an E-UTRAN (universal mobile telecommunications system (Evolved-UMTS) terrestrial radio access network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or global system for mobile communication (GSM) (GERAN)/enhanced data rates for global evolution (EDGE) radio access network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an interworking wireless local area network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, recently, the high speed data traffic has been rapidly increased. In order to meet such traffic increase, technologies have been introduced for offloading the traffic of UE to WLAN (Wi-Fi) or a small cell.

FIG. 2 is a schematic diagram illustrating a network structure to which a small cell or a WLAN AP is added.

Referring to FIG. 2, within the coverage of a base station 31 for the small cell, a plurality of WLAN AP may be arranged. That is, several radio access technologies (RATs) are existed around a UE. Accordingly, the UE may distribute data traffic into the several RATs. The base station 31 for small cell may be arranged within the coverage of a macro base station such as the existing eNodeB.

As known from by reference to FIG. 2, the P-GW 53 and the HSS 54 are connected to an access authentication authorization (AAA) server 56. The P-GW 53 and the AAA server 56 may be connected to an evolved packet data gateway (ePDG) 57. The ePDG 57 plays a role of a security node for not being trusted non-3GPP network (e.g., WLAN or Wi-Fi, etc.). The ePDG 57 may be connected to a WLAN access gateway (WAG) 58. The WAG 58 may be in charge of a role of P-GW in Wi-Fi system.

As such, as the existing mobile communication network is associated with a hetero network, a discussion is required for selecting an optimal wireless network for performing a specific operation, for example, a wireless network for low power.

SUMMARY OF THE INVENTION

An object of the present invention is to provide a method for performing a location area update and paging transmission/reception through an optimal RAT, in case that the UEs are available to communicate with each other through a radio interface according to radio protocols different from each other.

Another object of the present invention is to provide a method for determining an optimal RAT for a location area update and paging transmission/reception using the Wi-Fi interface in a multi-RAT environment.

A user equipment that is available to perform a radio access through a first radio interface by a first radio protocol and a radio access through a second radio interface by a second radio protocol may determine an optimal radio access interface based on a predetermined condition, perform tracking area (TA) update through the optimal radio access interface, and transmit and receive paging information through the optimal radio access interface.

The radio interface that consumes less power for performing the location area update between the first radio interface and the second radio interface may be determined to be the optimal radio access interface.

The radio interface that has larger cell coverage between the first radio interface and the second radio interface may be determined to be the optimal radio access interface.

The radio interface that is accessed the most recently between the first radio interface and the second radio interface may be determined to be the optimal radio access interface.

If the radio access through the first radio interface is a radio access based on cellular, and the radio access through the second radio interface is a radio access based on WLAN, and if connection management and mobility management of a core network are available to be performed based on the WLAN, the second radio interface may be determined to be the optimal radio access interface.

If the radio access through the first radio interface is a radio access based on cellular, and the radio access through the second radio interface is a radio access based on WLAN, and if downlink coverage and uplink coverage through the first radio interface are asymmetric, the second radio interface may be determined to be the optimal radio access interface.

Transmitting and receiving the paging information may be performed based on at least one of the conditions used for determining the radio interface through which the location area update is performed the most recently and the optimal radio access interface.

Advantageous Effects

According to the present invention, a method is provided for performing a location area update and paging transmission/reception through an optimal RAT, in case that the UEs are available to communicate with each other through a radio interface according to radio protocols different from each other.

According to an embodiment of the present invention, a method is provided for determining an optimal RAT for a location area update and paging transmission/reception using the Wi-Fi interface in a multi-RAT environment.

DESCRIPTION OF EXEMPLARY EMBODIMENTS

A wireless device may be fixed and may have mobility, and may be referred to as other terms such as user equipment (UE), MS (mobile station), UT (user terminal), SS (subscriber station), and MT (mobile terminal). In general, a base station (BS) refers to a fixed station communicating with the wireless device, and may be referred to as other terms such as eNB (evolved-NodeB), BTS (base transceiver system), and access point (AP).

The following description will be made where the present invention is applied based on 3GPP (3rd Generation Partnership Project) 3GPP LTE (long term evolution) or 3GPP LTE-A (LTE-Advanced). This is illustrative purpose only and the present invention is applicable to various wireless communication networks. Hereinafter, the LTE includes LTE and/or LTE-A.

The present specification is described targeted to a communication network, and tasks performed in the communication network may be performed during controlling network by a system (e.g., a base station) that controls the corresponding communication network or performed by a UE which is linked to the corresponding network.

Figure 1:
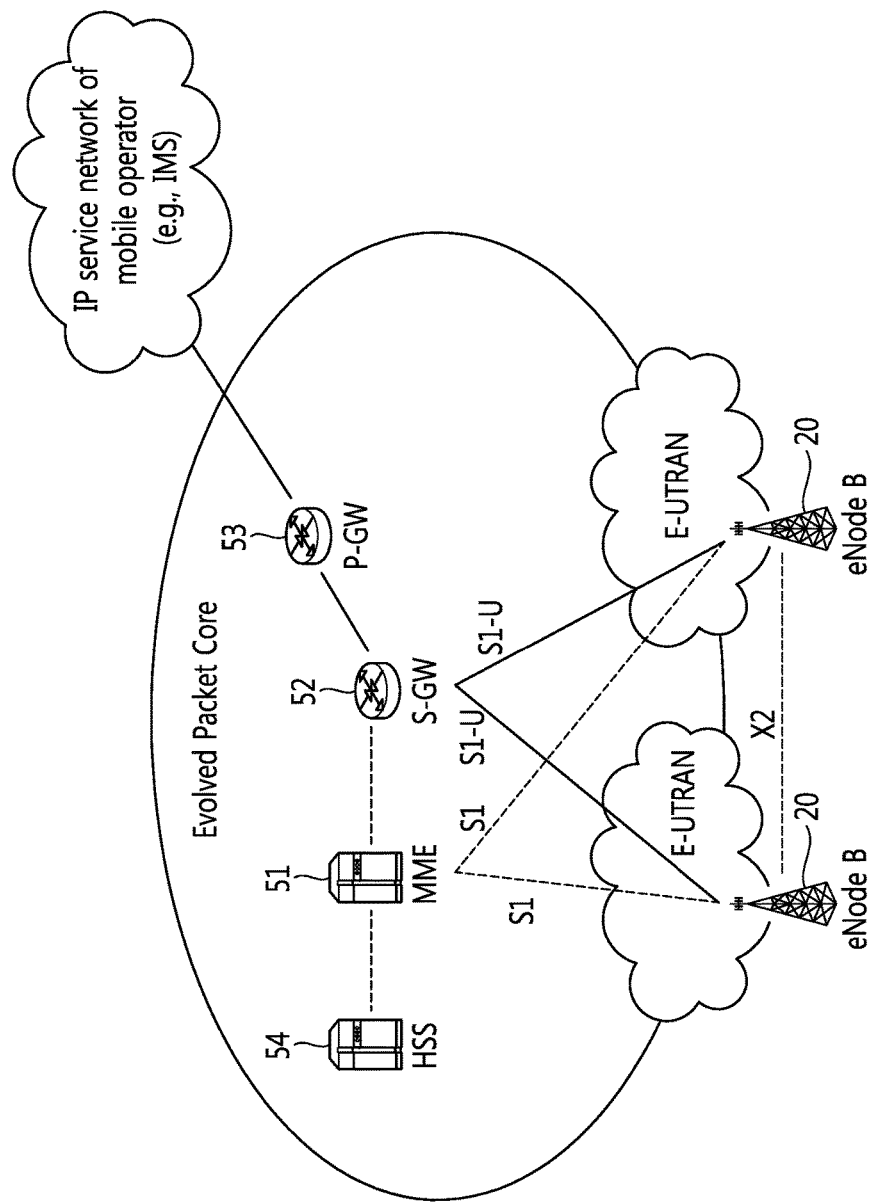
FIG. 1 is a schematic diagram illustrating a structure of evolved mobile communication network.
Figure 2:
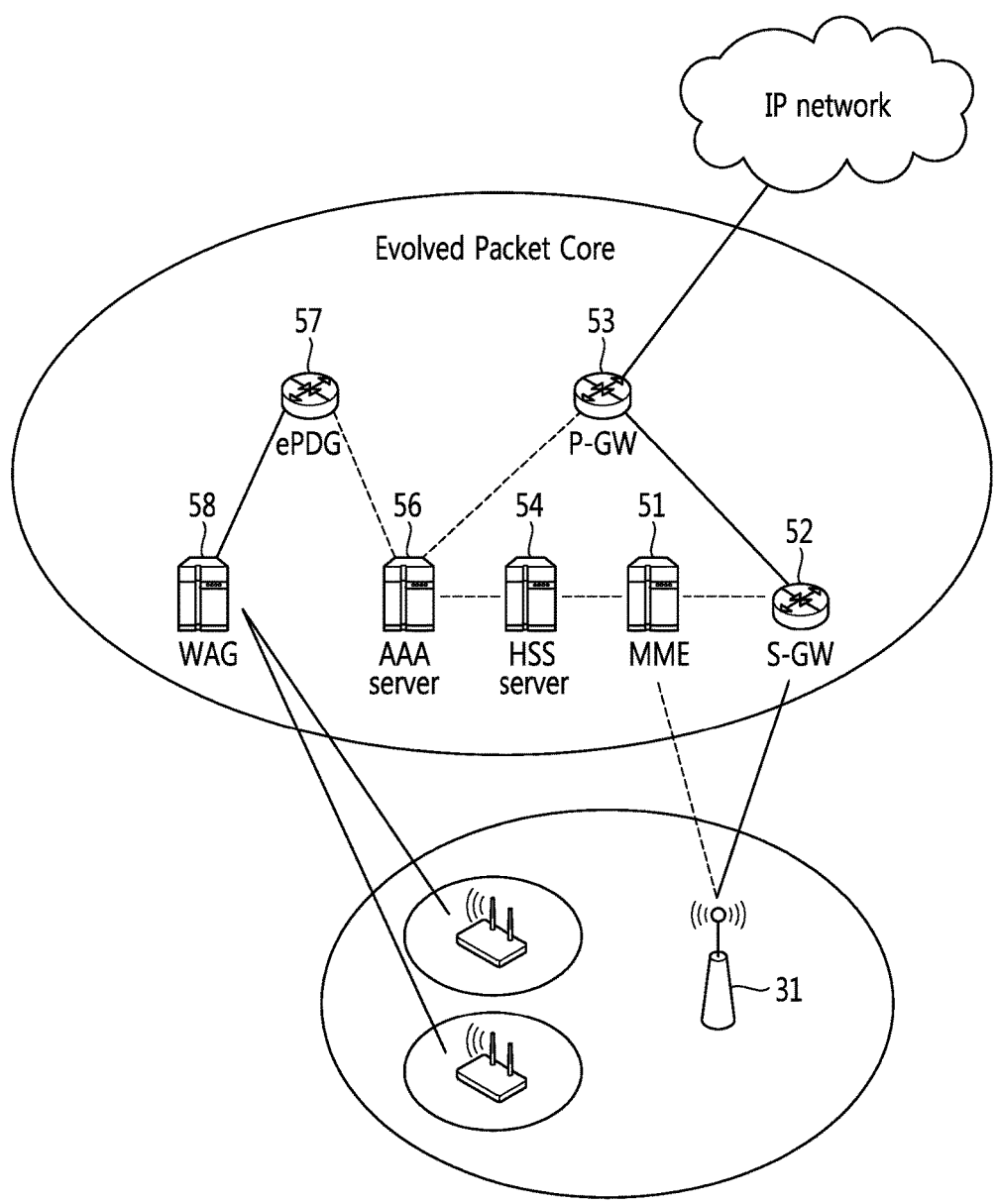
FIG. 2 is a schematic diagram illustrating a network structure to which a small cell or a WLAN AP is added.
Figure 3:
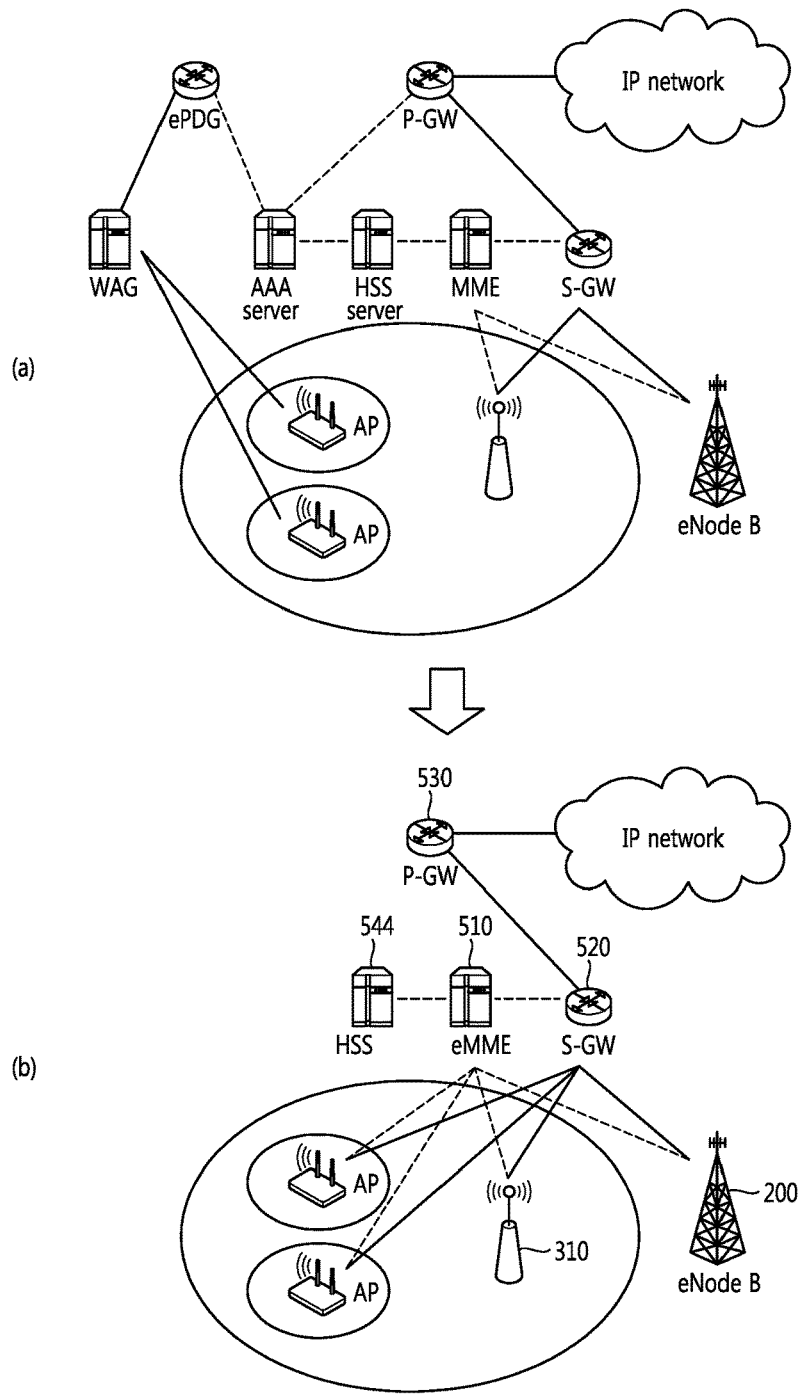
FIG. 3 is a diagram illustrating an example by comparing the existing mobile communication network structure and a network structure improved according to the present invention.

FIG. 3 is a diagram illustrating an example by comparing the existing mobile communication network structure and a network structure improved according to the present invention.

In comparison with the existing mobile communication network structure shown in FIG. 3 (a), an enhanced MME (eMME) 510 and an enhanced GW (eGW) 520 may be included according to the improved network structure shown in FIG. 3 (b). Although it is depicted that the eMME 510 and the eGW 520 are separated in FIG. 3 (b), the eMME 510 and the eGW 520 may be separated only in logical manner, but combined in a device in physical manner. In addition, although it is depicted that the eGW 520 and a P-GW 530 are separated in FIG. 3 (b), the eGW 520 and the P-GW 530 may be combined in a device.

The eMME 510 may be connected to a WLAN access point (AP) as well as an eNodeB 200 and a BS 310. For this, a new interface may be added between the eMME 510 and the WLAN AP. Similarly, the eGW 520 may be connected to the WLAN access point (AP) as well as the eNodeB 200 and the BS 310. For this, a new interface may be added between the eGW 520 and the WLAN AP.

The UE shown in FIG. 3 may perform a wireless connection through radio interfaces different from each other, and such a wireless connection may be managed by a RE or a specific wireless node. In addition, through a specific wireless node, an interface may be generated according to a non access stratum (NAS) protocol between a UE and a core network.

Such a radio interface may include 2G, 3G, 4G, 5G, Wi-Fi, WiMAX, LTE, and so on as well as the Wi-Fi interface shown in FIG. 3. In more particular, in case that a UE is existed indoors, an accessible radio interface includes 3G, 4G, 5G, Wi-Fi, and so on. In case that a UE is existed outdoors, an accessible radio interface includes 3G, 4G, 5G, and so on.

A location update area may include one or more BSs by a network operator, and called by other term, location area (LA), routing area (RA), tracking area (TA), and the like. Hereinafter, it will be described that the present invention is applied based on TA.

Meanwhile, if a specific cycle or a tracking area code (TAC) of its own is different from a TAC received from a wireless node such as a BS or a WLAN AP, a UE performs a tracking area update (TAU) and transmits and receives paging information.

As such, when transmitting/receiving the TAU and the paging information, the UE may determine one of a plurality of RATs to be an optimal RAT depending on a radio environment or a specific condition, perform the tracking area update (TAU) through the determined RAT, and transmit and receive the paging information.

Figure 4:
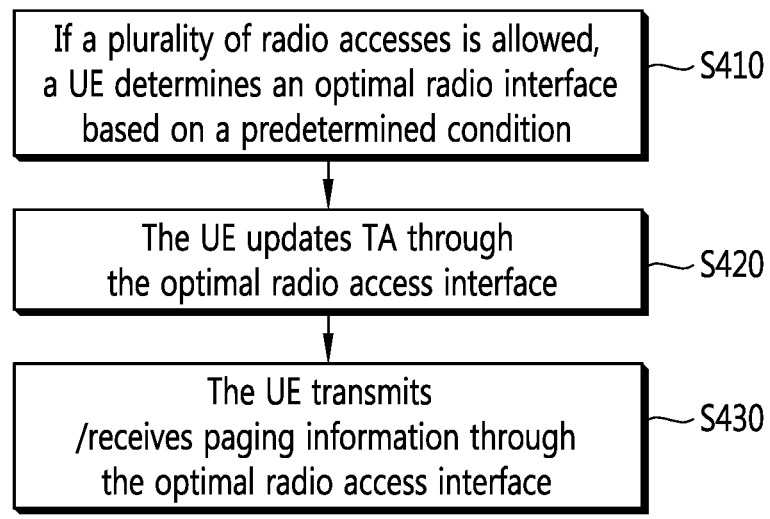
FIG. 4 is a control flowchart for describing a method for TAU and transmitting/receiving paging information according to the present invention.

FIG. 4 is a control flowchart for describing a method for TAU and transmitting/receiving paging information according to the present invention.

In case that a radio access network through a first radio interface according to a first protocol and a radio access network through a second radio interface according to a second protocol are existed, that is, in an environment in which a plurality of hetero radio access networks are existed, a UE may determine an optimal radio interface based on a predetermined condition (step, S410).

There are several conditions that a UE determines on optimal radio interface, the UE may determine an optimal radio interface according to the radio environment of its own, that is, a context of the UE on whether the UE is existed indoors or existed outdoors, or whether moving speed is high or low.

For example, a UE may determine a radio interface that consumes less power when performing a specific operation to be an optimal radio interface between the first radio interface and the second radio interface. If there are Wi-Fi, 5G, 3G, and 4G as the radio interface, the power consumption decreases in the descending order of Wi-Fi, 5G, 3G, and 4G. A UE may determine a radio interface that consumes lower power to be an optimal radio interface depending on situations.

For example, in case that the radio access through the first radio interface is a radio access based on cellular and the radio access through the second radio interface is a radio access based on WLAN, a UE may determine the second radio interface that is anticipated to consume lower power to be an optimal radio interface, and perform paging transmission/reception.

Or, a UE may determine a radio interface of which cell coverage is wider to be an optimal radio interface between the first radio interface and the second radio interface. If there are Wi-Fi, 5G, 3G, and 4G as the radio interface, the cell coverage increases in the ascending order of Wi-Fi, 5G, 3G, and 4G. The UE may determine a radio interface of which cell coverage is wider to be an optimal radio interface depending on situations.

For example, in case that a UE is moving and its speed is high, the UE may determine a radio interface of which cell coverage is wide, for example, 3G to be an optimal radio interface.

The cell coverage or the power consumption that is a standard of determining an optimal radio interface may be differently applied depending on whether a UE is existed indoors or existed outdoors.

For example, in case that a UE is existed indoors, a radio interface of which cell coverage is wide (e.g., 3G) may be selected if the moving speed of the UE is high, but a radio interface that consumes low power (e.g., Wi-Fi) may be selected if the moving speed of the UE is low.

On the other hand, in case that a UE is existed outdoors, a radio interface of which cell coverage is wide (e.g., 3G) may be selected if the moving speed of the UE is high, but a radio interface that consumes low power (e.g., 5G) may be selected if the moving speed of the UE is low.

According to another embodiment, a UE may determine a radio interface that is the most recently accessed to be an optimal radio interface between the first radio interface and the second radio interface.

According to another embodiment, an optimal radio interface may be determined depending on a type of UE or a service type provided to a UE. For example, in case that a UE requires low power such as machine to machine (M2M), Wi-Fi that has low power consumption may be determined to be an optimal radio interface. In case that a UE requires low delay such as health care, 5G that has low latency may be selected as an optimal radio interface.

When an optimal radio interface is determined, a UE may access to the optimal radio interface, and then, may update TA through the corresponding interface (step, S420).

Furthermore, the UE may transmit/receive paging information through the optimal radio interface (step, S430).

Although the TA update and the paging transmission/reception may be interconnected and performed through the same radio interface, the TA update and the paging transmission/reception may be performed through radio interfaces different from each other, depending on situations.

Based on at least one of the radio interface that performs TA update lastly and the condition used for determining the optimal radio interface, a paging message may be transmitted and received.

Such a paging may be controlled by a network controller within a core network, and also be controlled by a wireless node such as a RE that controls a radio interface.

Hereinafter, according to an example of the present invention, a method for updating TA and transmitting/receiving paging information by a UE will be described in case that a radio access through the first radio interface is based on cellular and a radio access through the second radio interface is based on WLAN.

Figure 5:
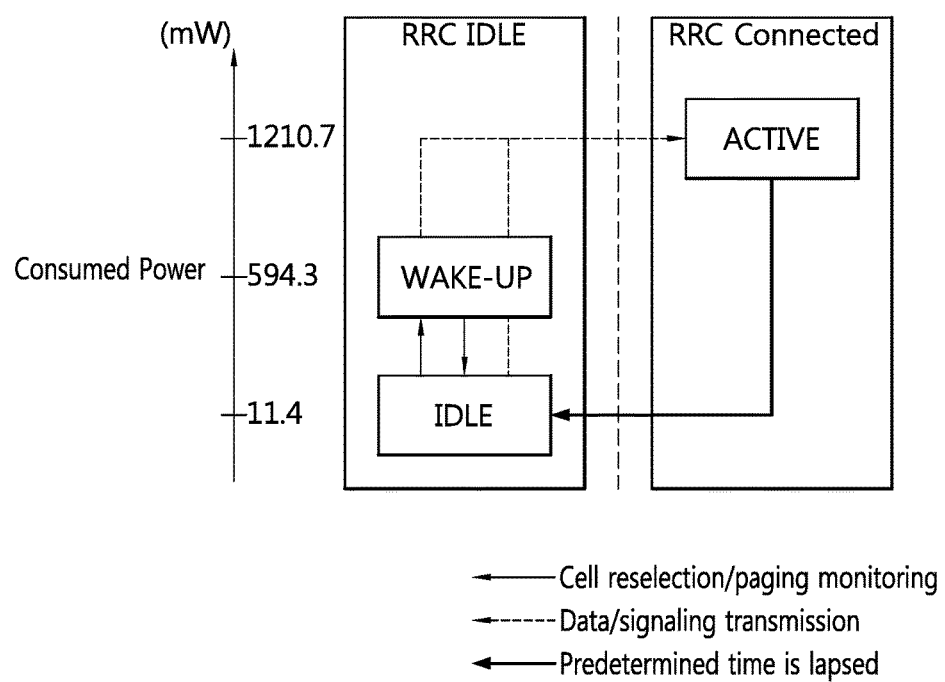
FIG. 5 is a diagram illustrating power consumption according to a RRC state of UE.

FIG. 5 is a diagram illustrating power consumption according to a RRC state of UE.

In case that a UE and a BS are accessed wirelessly by a radio interface, the radio resource control (RRC) state that represents the connection state includes a connected state and an idle state, and there states are switched from each other in a regular cycle.

As shown in FIG. 5, in case that the RRC is in the connected state, the communication state of UE is in an active state, and in case that the RRC state is in idle state, the communication state of UE is either a wake-up state or an idle state.

The RRC is switched from the connected state to the idle state if predetermined time is lapsed and there is no data to be transmitted or received.

In addition, even in case that the idle state is continued, the communication state of UE may be switched from the idle state to the wake-up state or from the idle state to the active state according to a regular cycle or an event.

In order to monitor a cell reselection and a paging downlink, the communication state of UE may be switched from the idle state to the wake-up state.

Furthermore, the UE in the idle state may be switched to the active state for signaling of data or a specific signal, and also be switched from the wake-up state to the active state. The UE should report at which position the UE itself is located to the BS on every specific cycle or by being triggered by a specific event, and in this case, the UE is switched to the active state.

That is, the UE in the RRC idle state performs a reserved operation for data transmission/reception periodically, and such a state transit causes power consumption.

Table 1 represents periodic power consumption of UE in a RRC is in the idle state.

TABLE 1

| Idle UE operation | | Power consumption (mW) | Wake-up cycle |
|---|---|---|---|
| Idle -> Wake-up | Cell reselection | 594.3 | 0.16~1.28 sec |
|  | Paging monitoring | 594.3 | 0.32~2.56 sec |
| Idle -> Active | Location update | 1210.7 | 2 sec~186 min |

As represented in Table 1, a UE is switched from the idle state to the wake-up state when cell reselecting or paging monitoring, and at the moment, power consumption is about 594.3 mW. A wake-up cycle for cell reselection is 0.16 to 1.28 second, and a wake-up cycle for paging monitoring is 0.32 to 2.56 second.

In addition, a UE may be switched from the idle state to the wake-up state in a cycle of about 2 second to 186 minute for updating location. At the moment, about 1210.7 mW of power consumption occurs.

Meanwhile, the power consumption and the latency have a trade-off relationship. That is, a wake-up cycle becomes shorter when implementing low latency, and accordingly, the power consumption increases since the wake-up count increases.

On the other hand, in case of implementing, the wake-up cycle becomes longer, and accordingly, the wake-up count decreases, but the latency increases.

In such a situation, a low power technique that does not influence the latency may be required. An embodiment of the present invention proposes a method that is available to increase energy efficiency without changing latency while maintaining the wake-up count, that is, implement low power. A UE according to the present invention may determine a RAT that is available to implement low power among a plurality of RATs, and through this, manage a state transit of UE.

For example, in case that a UE register a location using the cellular interface, as shown in Table 1, power consumption is about 1210.7 mW, and in case of switching state for cell reselection or paging monitoring, about 594.3 mW of power is consumed. On the other hand, in case that a UE performs scanning through the Wi-Fi interface, power consumption is about 370 mW.

In case that a UE performs a location update using the Wi-Fi interface, about 484.8 mW of power is consumed. Accordingly, it is anticipated that power consumption decrease is about 60% of the case of using the cellular interface. Furthermore, in case that a UE performs paging transmission/reception using the Wi-Fi interface, about 370 mW of power is consumed. Accordingly, the power consumption may be decreased about 38% of the case of using the cellular interface.

In a multi-RAT environment, if both of the cellular interface and the Wi-Fi interface are in the idle state, a UE may perform location registration or paging transmission/reception through any one of the radio interfaces, and may determine the radio interface that consumes less power to be an optimal radio interface.

FIG. 6a to FIG. 6d are conceptual diagrams illustrating a configuration of radio entity (RE) that integrally manages a BS and a WLAN AP for a multi-RAT UE according to the present invention.

First, a radio entity (RE; or a radio access device) 300 is a newly introduced device according to the present invention, and makes it easy to manage a BS 310 and a WLAN AP 320 in order to strengthen a support of a multi-RAT UE 100. Such a RE includes several types according to the present invention.

Figure 6A:
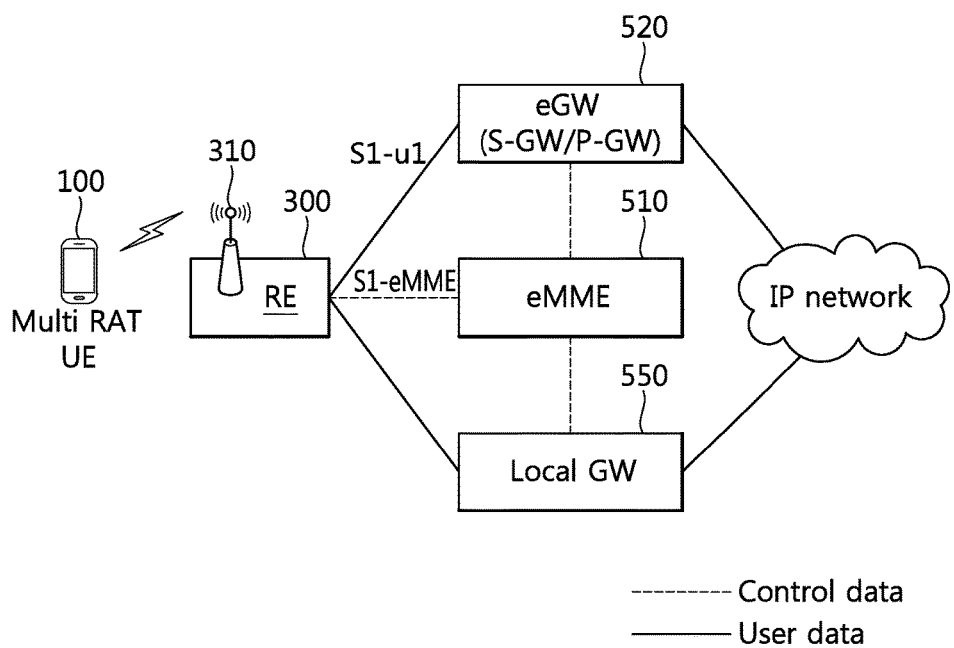
FIG. 6a to FIG. 6d are conceptual diagrams illustrating a configuration of radio entity (RE) that integrally manages a BS and a WLAN AP for a multi-RAT UE according to the present invention.

FIG. 6a illustrates a concept of RE according to a first type, and the RE 300 of the first type supports only the cellular BS 310. At the moment, the RE 300 of the first type may be integrated in the cellular BS 310. The RE 300 of the first type is connected to an eGW 520 and a local GW 550 for transmitting and receiving user data, and is connected to an eMME 510 for transmitting and receiving control data. The eGW 510 may perform at least one of the functions of S-GW and P-GW. The local GW 520 is a gateway that enables to access a home network in a home or an office.

The multi-RAT UE 100 and the RE 300 may be connected through an access stratum (AS) protocol, and the multi-RAT UE 100 and the eMME 510 may be connected through a non access stratum (NAS) protocol that is an interface between a UE and a core network.

As shown in FIG. 6a, between the RE 300 and the eMME 510, an interface such as S1-eMME may be formed, and between the RE 300 and the eGW 520, an interface such as S1-U1 may be formed.

Figure 6B:
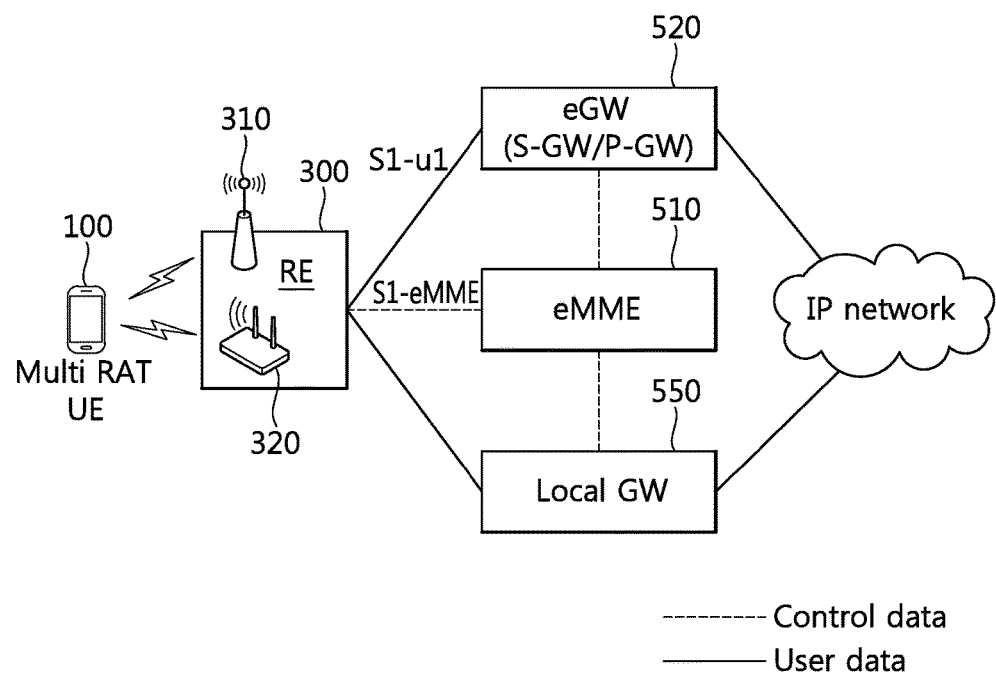

FIG. 6b illustrates a concept of RE according to a second type, and the RE 300 of the second type supports both of the cellular BS 310 and the WLAN AP 320. At the moment, the RE 300 of the second type may be a device that integrates the cellular BS 310 and the WLAN AP 320.

According to FIG. 6b, the multi-RAT UE 100 may be connected to the RE 300 through at least one of the cellular link and the Wi-Fi link.

Figure 6C:
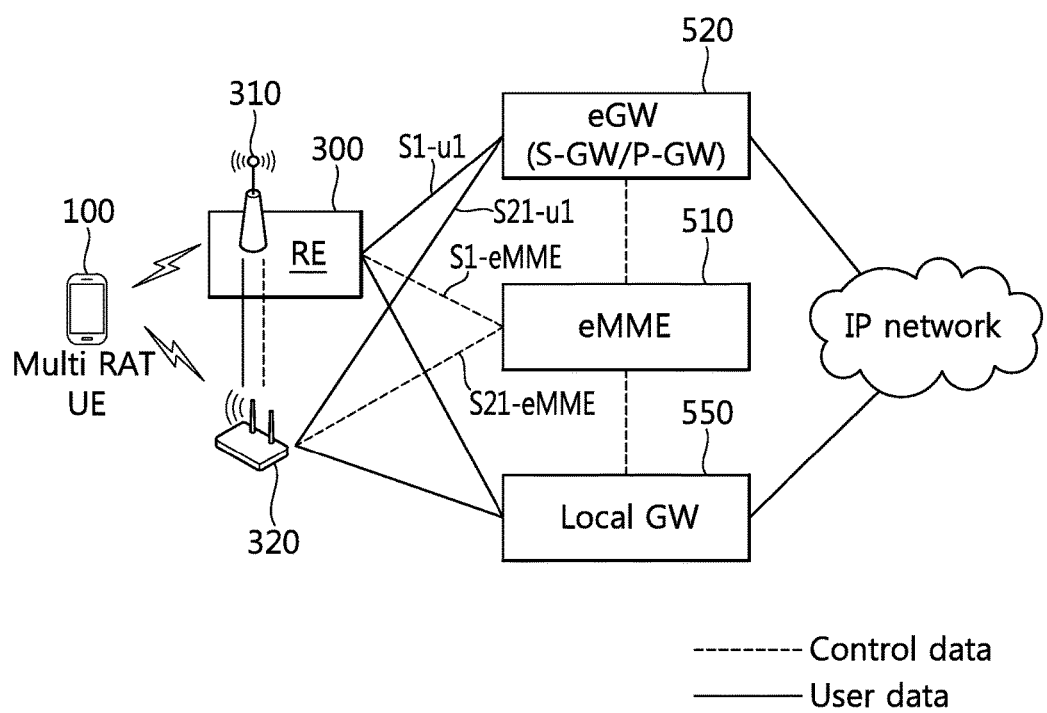

FIG. 6c illustrates a concept of RE according to a third type, and the RE 300 of the third type may be integrated in the cellular BS 310, but has an interface with the WLAN AP 320.

As shown in FIG. 6c, between the WLAN AP 320 and the eGW 520, an interface such as S21-U1 may be formed, and between the WLAN AP 320 and the eMME 510, an interface such as S21-eMME may be formed.

According to FIG. 6c, in case that the multi-RAT UE 100 is available to communicate through the Wi-Fi link, a UE may access to the core network directly through the WLAN AP 320, or may access to the core network via the RE 300 by using an interface between the WLAN AP 320 and the RE 300.

According to the RE 300 of the third type, even though the multi-RAT UE 100 accesses to the WLAN AP 320 through the Wi-Fi link, the multi-RAT UE 100 may be the subject to manage the connection between the WLAN AP 320 and the core network.

Figure 6D:
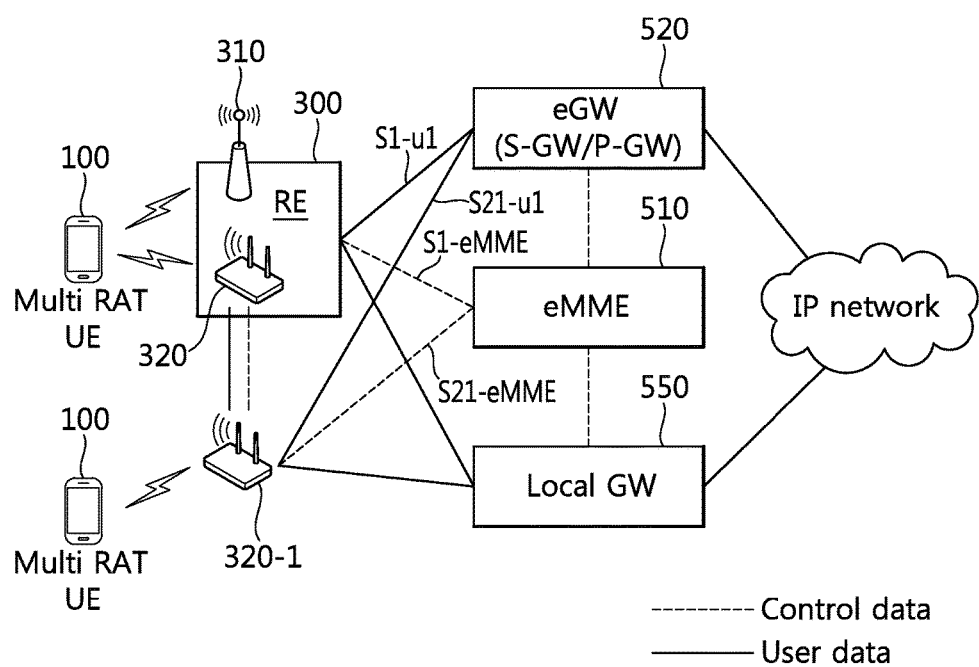

FIG. 6d illustrate a concept of RE according to a fourth type, and the RE of the fourth type has a concept in which the RE of the second type and the RE of the third type are mixed. That is, the RE 300 of the fourth type is a device that integrates the cellular BS 310 and the WLAN AP 320, and an interface with an external WLAN AP 320-1 may be added.

The multi-RAT UE 100 may be access to the core network by being connected to the RE 300 through at least one of the cellular link and the Wi-Fi link, or may also access to the core network via the WLAN AP 320 in case of being communicated through the Wi-Fi link. Or, as described in the third type, the multi-RAT UE 100 may access to the core network via the RE 300 using an interface between the WLAN AP 320 and the RE 300.

As such, the RE that has various types may be existed, and such a WLAN AP may be collocated to the RE or existed with being connected to the RE with each other.

Hereinafter, a method of TAU through the Wi-Fi interface or performing paging transmission/reception by a UE will be described in more detail.

Previously, since the TAU or the paging transmission/reception was not performed through the Wi-Fi interface, according to the present invention, system information (SI) for this should be newly designed, and a UE may perform the TAU and paging related operations only in case of receiving the SI.

The SI may be received to a UE through a beacon, a probe, a unicast frame or an access network query protocol (ANQP) response which is a message of the ANQP.

The SI may include Wi-Fi type information, indicators for an evolved connection management (ECM) and an evolved mobility management (EMM) and a tracking area code (TAC).

According to the present invention, there are four types of Wi-Fi. The first type may be the existing legacy AP, and the second type may be an AP which is physically collocated with a RE like the WLAN AP shown in FIG. 6b. The third type may be an AP which is physically connected to a RE like the WLAN AP shown in FIG. 6c. Lastly, the fourth type may be an AP in which the second type and the third type are combined (hybrid AP).

The indicator for the evolved connection management (ECM) and the evolved mobility management (EMM) indicates a function that a UE may perform using an interface which is configured through the NAS protocol with the core network. That is, the indicator means an identifier that represents which function may be performed through a WLAN AP among the functions performed through the existing BS.

An interface through the NAS protocol may be formed between a UE and the core network, and through this, the connection state and the mobility may be managed.

The ECM state of an eMME that corresponds to a network controller within a UE and a core network may be switched between the idle state and the connected state depending on a predetermined condition or situation. According to the present invention, if at least one RAT among a plurality of RATs is connected, the ECM state is in the connected state, and if a UE does not have a radio interface through any RAT, the ECM state is in the idle state.

Meanwhile, the EMM state of a UE and an eMME is switched from a registered state to a deregistered state if detachment or attachment is rejected (Attach/Detach reject), tracking area update (TAU) is rejected (TAU reject), or all of bearers become deactivated (All bearers deactivated).

On the other hand, if attachment is accepted (Attach accept) or tracking area update (TAU) for UE selection is accepted (TAU accept for a UE selecting), the EMM is switched from the deregistered state to the registered state.

If it is not possible to perform all ECM/EMM functions through a WLAN AP, that is, in case of the existing WLAN AP, the indicator may be set to "00". If it is available to perform all ECM/EMM functions through a WLAN AP, the indicator of WLAN AP may be set to "01".

If it is available to perform the ECM/EMM functions related to connection and session through a WLAN AP, for example, in case that it is available to perform only Attach, Detach and Service request, the indicator of WLAN AP may be set to "10".

In addition, in case that the indicator of WLAN AP is set to "11", the ECM/EMM functions related to mobility, for example, routing area update and TAU, and paging related function may be performed through the WLAN AP.

A UE may know which function is performed by the WLAN AP that forms current radio access with by receiving an indicator from the WLAN AP or the RE. In case that the indicator indicates "01" or "11" as described in the above example, TAU and paging transmission/reception may be performed through the WLAN AP.

The TAC may be acquired during the process of setup an interface (e.g., S1-eAP, X2-eAP) with an eMME or a RE, and a UE may perform TAU if the TAC stored by its own is different from the TAC which is acquired.

Figure 7:
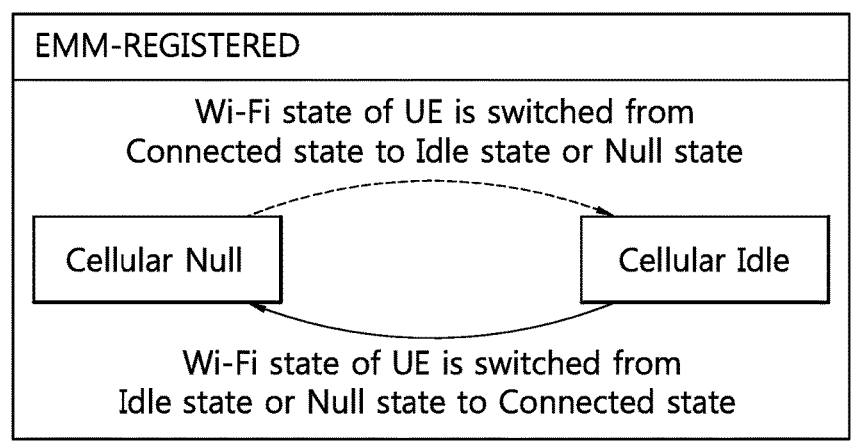
FIG. 7 is a diagram for describing a state transit to Wi-Fi state and cellular state of UE according to an embodiment of the present invention.

FIG. 7 is a diagram for describing a state transit to Wi-Fi state and cellular state of UE according to an embodiment of the present invention.

In this specification, a Wi-Fi state of UE may mean a state of communication module using the Wi-Fi interface, and a cellular state may mean a state of communication module using the cellular interface.

A cellular idle state means the existing idle state. That is, a UE may set to the idle state initially after power on.

Although a cellular null state is similar to the idle state, the cellular null state represents a state that does not monitor a broadcast channel (BCH), paging, and so on. That is, the cellular null state means a state that maintains a RRC low power state, not switching to the wake-up state.

A Wi-Fi idle state represents a state that performs scanning periodically in the existing idle state (not associated).

A Wi-Fi null state represents a state which is similar to the idle state but not monitoring a beacon and paging, and so on. A UE may be set to the Wi-Fi idle state when initial wireless connection, and then may be switched to the Wi-Fi null state according to a predetermined cycle.

In case that it is available to communicate using the Wi-Fi interface, the Wi-Fi state becomes the connected state (associated), and in case that it is available to communicate using the cellular interface, the cellular state becomes the connected state.

FIG. 7 may be applied to the case that a WLAN AP performs only the ECM/EMM function related to the connection and session similar to the case of the indicator "10" for the WLAN AP. Or, in case that a WLAN AP may perform all of the ECM/EMM functions, FIG. 7 may be applied to specific ECM/EMM cases (e.g., Attach request/accept, TAU request/accept, RAU request/accept, etc.).

As shown in FIG. 7, the EMM is in the registered state (REGISTERED), and the cellular state may be switched depending on a Wi-Fi state of UE. Such a state transit is performed without explicit indication of a network element such as a BS. In addition, the network element such as a BS may implicitly know the cellular state of the corresponding UE according to the Wi-Fi state of UE.

When the Wi-Fi state of UE is switched from the connected state to the idle state or the null state, the cellular state is switched from the null state to the idle state.

That is, in case that a UE is not available to communicate using the Wi-Fi interface, the cellular state is switched to a state that monitors BCH or paging information.

On the other hand, when the Wi-Fi state of UE is switched from the idle stat or the null state to the connected state, the cellular state is switched from the idle state to the null state.

That is, in case that a UE is available to communicate using the Wi-Fi interface, the cellular state is switched to a state that does not monitor BCH or paging information.

Figure 8A:
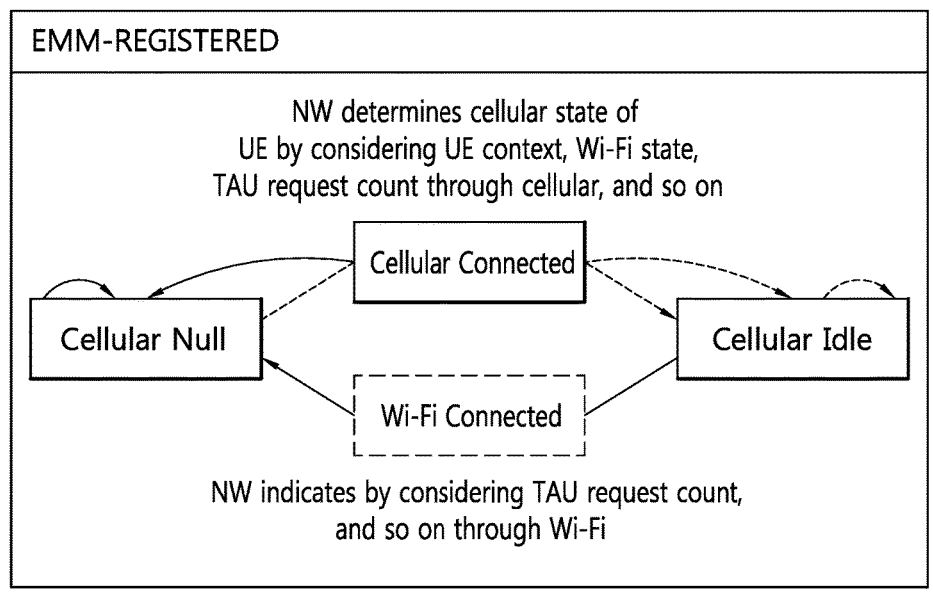
FIG. 8a and FIG. 8b are diagrams for describing a state transit to Wi-Fi state and cellular state of UE according to another embodiment of the present invention.
Figure 8B:
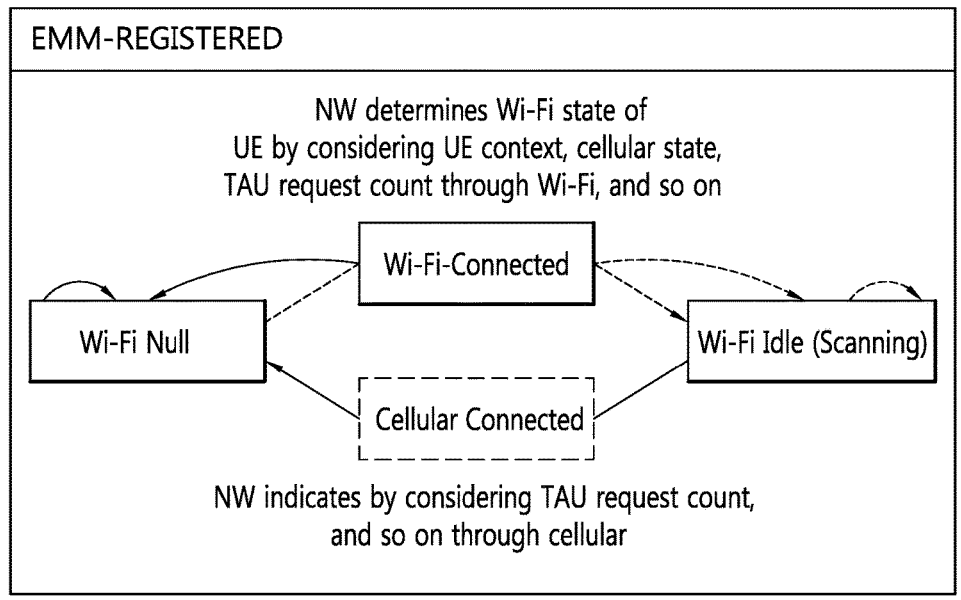

FIG. 8a and FIG. 8b are diagrams for describing a state transit to Wi-Fi state and cellular state of UE according to another embodiment of the present invention. FIG. 8a illustrates a state transit of cellular state according to an embodiment, and FIG. 8b illustrates a state transit of Wi-Fi state according to an embodiment.

FIG. 8a and FIG. 8b may be applied to the case that a WLAN AP performs the ECM/EMM function related to the mobility similar to the case of the indicator "11" for the WLAN AP. Or, in case that a WLAN AP may perform all of the ECM/EMM functions, FIG. 8 may be applied to specific ECM/EMM cases (e.g., Attach request/accept, TAU request/accept, RAU request/accept, etc.).

As shown in FIG. 8a, the cellular state of UE may be determined by a wireless network (BS or RE) by considering a context of UE, a Wi-Fi state, TAU request count through the cellular interface, and so on.

Furthermore, the cellular state of UE may be determined by a wireless network by considering TAU request count through the Wi-Fi interface, and so on.

As shown in FIG. 8b, the Wi-Fi state of UE may be determined by a wireless network by considering a context of UE, a cellular state, TAU request count through the Wi-Fi interface, and so on.

In addition, by considering TAU request count through the cellular interface when the cellular state is switched to the connected state, the wireless network may determine the Wi-Fi state.

Table 2 represents a RAT that performs TAU among the ECM/EMM processes according to the function of WLAN AP.

TABLE 2

| State of Multi-RAT device | | TA code switch perceiving RAT | | TAU performing RAT | |
|---|---|---|---|---|---|
| NAS (Core NW) | AS (RAN) | | | | |
| EMM | ECM | Cellular | Wi-Fi | Cellular | Wi-Fi |
| Case #1 Registered | Idle Null | — | ✓ | ✓ | — |
| Case #2 | | | | — | ✓ |
| Case #3 Registered | Idle Idle | ✓ | — | ✓ | — |
| Case #4 | | | | — | ✓ |
| Case #5 | | — | ✓ | ✓ | — |
| Case #6 | | | | — | ✓ |

Referring to Table 2, the RAT that performs TAU is determined depending on the radio interface that monitors the cellular state and the TAC of a UE (multi-RAT device).

As shown in Table 2, for all cases, it is presumed that the EMM module that corresponds to an interface (non access stratum; NAS) of a UE and a core network (Core NW) is in the registered state (Registered) and the ECM state is in the idle state (Idle).

The cellular state that corresponds to an interface (access stratum; AS) between a UE and a radio access network (RAN) may be distinguished by a null state and an idle state. In case 1 and case 2 (Case #1 and Case #2), the cellular state is in the null state, and in case 3 to case 6 (Case #3 to Case #6), the cellular state is in the idle state.

In case of case 1 and case 2, and case 5 and case 6, whether the TAC is changed may be monitored through the Wi-Fi interface, and in case of case 3 and case 4, whether the TAC is changed may be monitored through the cellular interface.

The RATs, that is, the radio interface that monitors whether the TAC is changed and the radio interface that performs the TAU, may be either identical or different.

In case of case 1, whether the TAC is changed may be monitored through the Wi-Fi interface, but the TAU may be performed through the cellular interface. For example, the case that is determined to be a link failure since it is not allowed to perform the ECM/EMM related function through the Wi-Fi interface or the Wi-Fi link related signal, that is, a beacon or a probe is not sensed for a predetermined duration may be classified to case 1.

In case of case 2, whether the TAC is changed may be monitored through the Wi-Fi interface, and the TAU may also be performed through the Wi-Fi interface. The case that it is allowed to perform the ECM/EMM through the Wi-Fi interface may be classified to case 2.

In case of case 3, whether the TAC is changed and the TAU may be performed through the cellular interface, which corresponds to the existing case.

In case of case 4, whether the TAC is changed may be monitored through the cellular interface, but the TAU may be performed through the Wi-Fi interface. The case that there is not cellular network that a UE is to access for uplink in case that a downlink coverage is different from an uplink coverage, the case that there is no cellular network link since BCH is not detected for a predetermined duration, and the case that it is allowed to perform the ECM/EMM through the Wi-Fi interface may be classified to case 4.

In case of case 5, whether the TAC is changed may be monitored through the Wi-Fi interface, but the TAU may be performed through the cellular interface. Similar to case 1, the case that is determined to be a link failure since it is not allowed to perform the ECM/EMM related function through the Wi-Fi interface or the Wi-Fi link related signal, that is, a beacon or a probe is not sensed for a predetermined duration may be classified to case 5.

In case of case 6, whether the TAC is changed may be monitored through the Wi-Fi interface, and the TAU may also be performed through the Wi-Fi interface. Similar to case 2, the case that it is allowed to perform the ECM/EMM through the Wi-Fi interface may be classified to case 6.

Figure 9:
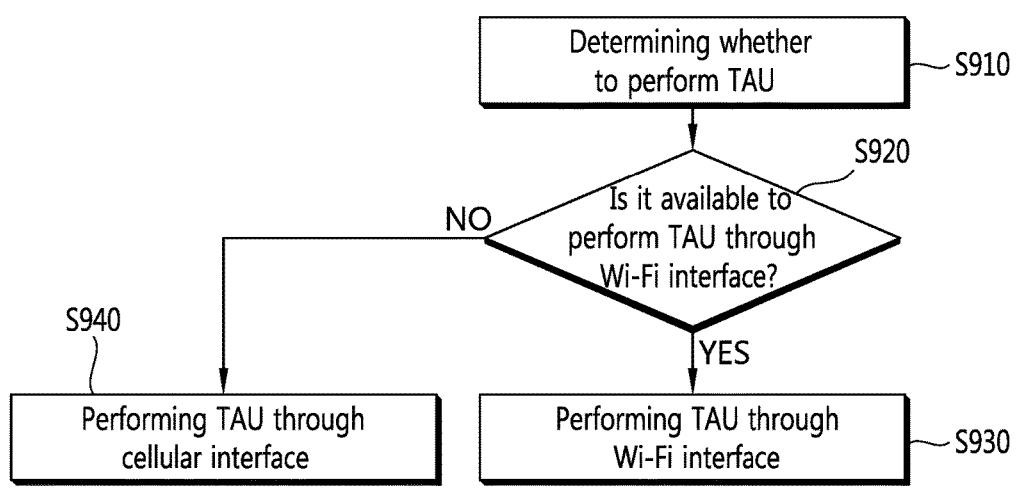
FIG. 9 is a control flowchart for describing a location area update through the Wi-Fi interface according to the present invention.

FIG. 9 is a control flowchart for describing a location area update through the Wi-Fi interface according to the present invention.

As shown in FIG. 9, first, a UE may determine whether to perform the TAU, that is, location area update (step, S910).

The TAU may be performed in every predetermined cycle, and similar to case 3 and case 4 in Table 2, may be performed when the TAC among the SI contents transmitted by a cellular RE which is determined to be an optimal radio interface is different from the TAC of its own.

Or, similar to case 1, case 2, case 5 and case 6, the TAU may be performed when the TAC among the SI contents transmitted by a WLAN AP which is determined to be an optimal radio interface is different from the TAC of its own.

Or, if a cellular link (BCH) or a Wi-Fi link (beacon/probe) is not detected for a predetermined duration or when it is tried to change a RAT for paging monitoring, the UE may perform the TAU.

In case 1, case 2, case 5 and case 6, if it is determined to perform the TAU, the UE may determine whether it is available to perform the TAU through the Wi-Fi interface (step, S920).

The UE may determine whether it is available to perform the TAU through the Wi-Fi type information described above and an indicator for the ECM and the EMM among the SI contents that the WLAN AP transmits.

As a result of the determination, if it is available to perform the TAU through the Wi-Fi interface like the case of case 2, case 4 and case 6, the UE performs the TAU through the Wi-Fi interface (step, S930).

For example, in case that the Wi-Fi types are the second type, the third type and the fourth type, and the indicator indicates "01" or "11", the UE may perform the TAU through the Wi-Fi interface.

Meanwhile, if it is not available to perform the TAU like the case of case 1 and case 2, the UE performs the TAU through the cellular interface (step, S940).

For example, the indicator indicates "00" or "10", the UE may perform the TAU through the cellular interface.

In case of case 1 and case 5, the UE may detect that the UE should perform the TAU in every TAU cycle or through the TAC that is transmitted by the WLAN AP, which is an optimal interface to the UE. That is, the UE may monitor the TAC through the Wi-Fi interface.

The UE that identifies that it is available to perform the TAU through the Wi-Fi interface may transmit a TAU message through the cellular interface in case that it is determined that it is not available to perform the TAU through the Wi-Fi interface.

At the moment, if the cellular state of UE is in the null state, the cellular state may be switched to the idle state.

Figure 10:
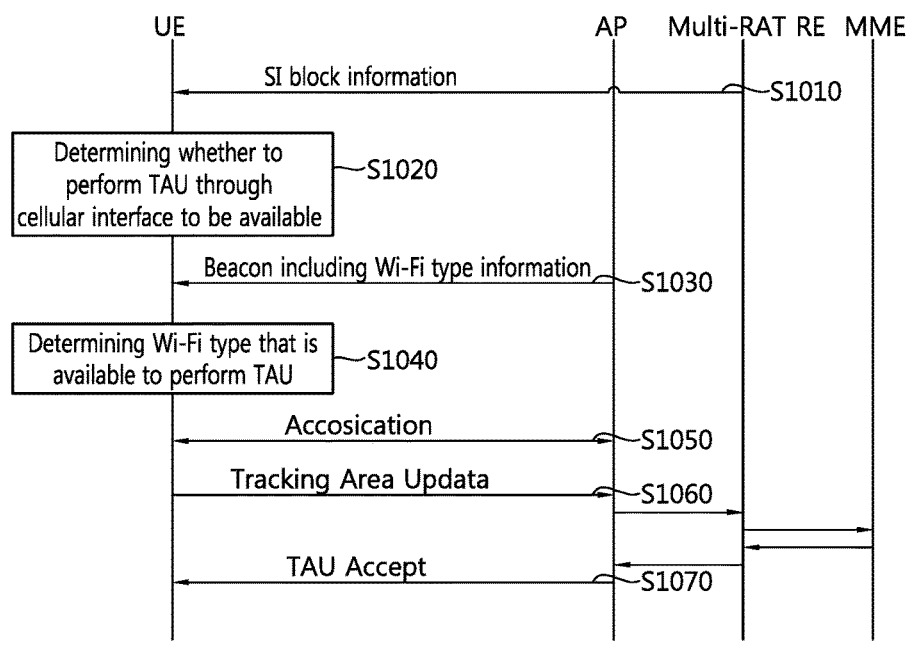
FIG. 10 is a control flowchart for describing a location area update through the Wi-Fi interface according to an embodiment of the present invention.

FIG. 10 is a control flowchart for describing a location area update through the Wi-Fi interface according to an embodiment of the present invention. In particular, FIG. 10 relates to case 4 of Table 2, and describes whether the TAC is changed is monitored by an optimal cellular interface to a UE, but the TAU is performed through the Wi-Fi interface.

A UE may detect to perform the TAU in every TAU cycle through the cellular interface or through SI block information transmitted by a RE (step, S1010).

The SI block information may include TAC, DL-Tx-Power, UL-RxLevMin, and the like, and the UE may receive synchronization signals, pilot signals, and so on.

The UE that receives the SI block information may determine whether to perform the TAU through the cellular interface by determining on whether there is a neighboring cellular network accessible, that is, determining whether the cellular link is available (step, S 1020).

For example, in case that there does not exist a cellular network that the UE is to access for uplink since downlink coverage and uplink coverage are different, and in case that a cellular network link does not exist since the BCH is not detected for a predetermined duration, the UE may determine that performing the TAU is not available through the cellular interface.

In this case, the UE checks the next optimal radio access network. Referring to FIG. 10, the UE receives a beacon that includes Wi-Fi type information received from a WLAN AP which is the next optimal radio access network (step, S 1030), and may determine the Wi-Fi type information to be the second to the fourth type that the TAU is available to be performed (step, S 1040).

If it is available to perform the TAU through the Wi-Fi interface, an association is established between the UE and the WLAN AP (step, S1050), and the UE may transmit a tracking area update message through the Wi-Fi interface (step, S 1060).

At the moment, the UE may transmit the information such as the RAT that performs the TAU, the reason of performing the TAU through the Wi-Fi interface, for example, the cellular network to access for uplink does not exist, together with the TAU message.

The WLAN AP that receives the TAU message may deliver the TAU message to an eMME via a RE using an interface with the RE or directly using an interface with the eMME.

The eMME that receives the TAU message transmits a response to this (TAU accept) to the UE (step, S 1070).

When the UE receives the TAU response, the cellular state of UE may be switched from the idle state to the null state.

Figure 11:
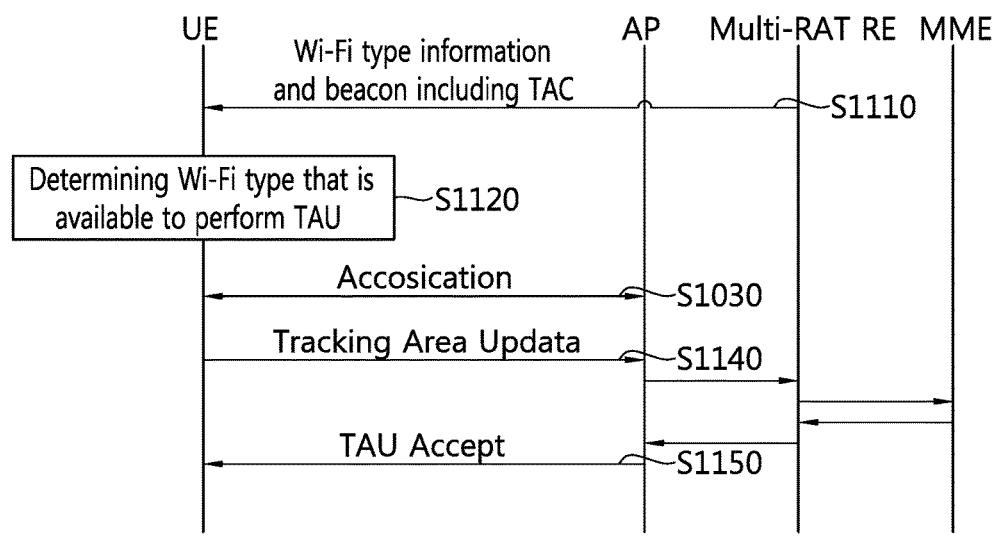
FIG. 11 is a control flowchart for describing a location area update through the Wi-Fi interface according to another embodiment of the present invention.

FIG. 11 is a control flowchart for describing a location area update through the Wi-Fi interface according to another embodiment of the present invention.

In particular, FIG. 11 relates to case 2 and case 6 of Table 2, and describes whether the TAC is changed is monitored by the Wi-Fi interface to a UE, and the TAU is also performed through the Wi-Fi interface.

A UE may detect to perform the TAU in every TAU cycle or by receiving the Wi-Fi type information and a beacon that includes the TAC (step, S 1110).

The UE may determine whether the WLAN AP is the second to the fourth type that is available to perform the TAU through the Wi-Fi type information (step, S 1120).

If it is available to perform the TAU through the Wi-Fi interface, an association is established between the UE and the WLAN AP (step, S1130), and the UE may transmit a tracking area update message through the Wi-Fi interface (step, S 1140).

At the moment, the UE may transmit the cause such as the RAT that performs the TAU, the reason of performing the TAU through the Wi-Fi interface, for example, whether to perform the TAU has been monitored through the Wi-Fi interface, together with the TAU message.

The WLAN AP that receives the TAU message may deliver the TAU message to an eMME via a RE using an interface with the RE or directly using an interface with the eMME.

The eMME that receives the TAU message transmits a response to this (TAU accept) to the UE (step, S1150).

When the UE receives the TAU response, the cellular state of UE may be switched from the idle state to the null state.

If the TAU is performed as described above, a RAT for transmitting a paging message may be selected.

The RAT for transmitting the paging message may be different depending on a sort of network in which the UE performs the TAU the most recently and the reason why perform the TAU through a hetero network (Wi-Fi network).

For example, if the RAT that the UE performs the TAU the most recently is the cellular network, or if the RAT that the UE performs the TAU the most recently is the Wi-Fi network and the TAU is performed using the Wi-Fi network because the cellular network for uplink access does not exist, the paging message is transmitted through the cellular network.

If the cellular network accessed for uplink does not exist, the paging message may be transmitted through the cellular network since downlink is available through the cellular network.

Or, if the RAT that the UE performs the TAU the most recently is the Wi-Fi network, or if the RAT that the UE performs the TAU the most recently is the Wi-Fi network and the TAU is performed using the Wi-Fi network because whether to perform the TAU is monitored through the Wi-Fi interface, the paging message is transmitted through the Wi-Fi network.

Or, if the TAU is performed several times repeatedly via the RE in the same distance or neighboring (collocated WLAN AP or connected WLAN AP), the paging message may be transmitted through the Wi-Fi network since it is determined that the UE is not mobile in a specific identical area such as an office, a café, a house, and the like.

Or, during a predetermined time section from a time when the RAT transmitting the paging message is changed, the paging message may be transmitted through both of the previous radio access network and the newly added radio access network. It may be configured that the paging message is transmitted through the newly added radio access network after the predetermined time section.

At the moment, Table 3 to Table 5 represent paging indication messages by an eMME.

TABLE 3

| Information Elements | Use |
| --- | --- |
| Message Type | Message type = Paging |
| UE Paging Identity | UE identity that represents to which UE is to perform paging (e.g., Temporary Mobile Subscriber Identity, International Mobile Subscriber |
| Paging DRX | Paging cycle |
| UE Identity index value | A value for calculating Paging Frame |
| Paging transmitting RAT | RAT trying to transmit Paging message (e.g., Cellular, Wi-Fi, Cellular & Wi-Fi) |
| Raging Area | Area that transmits paging message to the corresponding UE |

TABLE 3-continued

| Information Elements | Use |
| --- | --- |
| | TAI List: one or more TAs (transmitting through all RE and/or AP located in the corresponding Tracking area) |
| | AP List: one or more APs (transmitting through the corresponding APs) |
| CN Domain | CS (circular switch) or PS (packet switch) domain |
| Access RAT | Rat that a UE receiving the paging information is to access (e.g., Cellular, Wi-Fi) |
| Paging Priority | |

The paging indication message (information elements) of Table 3 may be transmitted to a WLAN AP through an eMME, may be transmitted to a RE through an eMME, or may be transmitted to a WLAN AP through an eMME via a RE.

Among the paging indication message, Message Type, UE Paging Identity, Paging DRX, UE Identity Index value, CN Domain and Paging Priority are the same as the contents which are transmitted in the existing paging indication message.

According to an embodiment, the information of paging transmitting RAT for the RAT trying to transmit a paging message of the corresponding UE (e.g., cellular, Wi-Fi, cellular & Wi-Fi), paging area that represents an area for transmitting a paging message, an access RAT that represents a RAT (e.g., cellular, Wi-Fi) that a UE receiving paging information is to access should be newly transmitted to a RE or a WLAN AP.

The TAI List in Paging Area may represent one or more TAs, and the AP List may be limited to a smaller area than the TA. An eMME and a RE may transmit the corresponding paging indication only to the AP included in the AP List.

According to the embodiment, the access RAT may be determined by an eMME, and transmitted to a UE via a RE and a WLAN AP.

TABLE 4

| Information Elements | Use |
| --- | --- |
| Message Type | Message type = Paging |
| UE Paging Identity | UE identity that represents to which UE is to perform paging (e.g., Temporary Mobile Subscriber Identity, International Mobile Subscriber |
| Paging DRX | Paging cycle |
| UE Identity index value | A value for calculating Paging Frame |
| Paging transmitting RAT | RAT trying to transmit Paging message (e.g., Cellular, Wi-Fi, Cellular & Wi-Fi) |
| Raging Area | Area that transmits paging message to the corresponding UE |
| | TAI List: one or more TAs (transmitting through all RE and/or AP located in the corresponding Tracking area) |
| | AP List: one or more APs (transmitting through the corresponding APs) |
| CN Domain Paging Priority | CS (circular switch) or PS (packet switch) domain |

The paging message of Table 4 may be transmitted to a WLAN AP through an eMME via a RE.

In Table 4, compared with Table 3, the information on the access RAT is omitted among the paging message. According to the embodiment, since the RAT that a UE receiving paging information is to access may determined by a RE, not an eMME, the access RAT may be omitted in the paging indication message.

TABLE 5

| Information Elements | Use |
| --- | --- |
| Message Type | Message type = Paging |
| UE Paging Identity | UE identity that represents to which UE is to perform paging (e.g., Temporary Mobile Subscriber Identity, International Mobile Subscriber |
| Paging DRX | Paging cycle |
| Paging Frame | Paging Frame |
| Raging Area | Area that transmits paging message to the corresponding UE<br>TAI List: one or more TAs (transmitting through all RE and/or AP located in the corresponding Tracking area)<br>AP List: one or more APs (transmitting through the corresponding APs) |
| CN Domain | CS (circular switch) or PS (packet switch) domain |
| Access RAT | Rat that a UE receiving the paging information is to access (e.g., Cellular, Wi-Fi) |
| Paging Priority | |

The paging indication message of Table 5 may be transmitted from a RE to a WLAN AP.

In Table 5, compared with Table 4, the UE Identity Index value, which is a value for calculating Paging Frame, is omitted in the paging indication message, and the information that directly indicating the paging frame is included in the paging indication message.

Since the module for calculating a paging frame is existed in a RE, the paging indication message transmitted from an eMME may include information for calculating a paging frame (UE identity index value).

On the other hand, in case that a RE transmits the paging message by managing a control for the paging frame, the RE may transmit the paging frame information which is calculated to a WLAN AP.

The RE may determine a RAT to which a UE that receives paging information is to access, and notify it to the WLAN AP through the paging indication message.

As such, the RE or the WLAN AP that receives the paging indication for each UE configures the paging message with one or more UEs that are going to perform paging to the same frame (subframe).

One paging message configured as such includes UE identity, CN domain per each UE, access RAT per each UE, and so on.

At the moment, the RE that receives the paging indication for each UE constructs the paging message with one or more UEs that are going to perform paging with cellular to the same frame (subframe). In addition, the RE may configure the paging message with one or more UEs that are going to perform paging with Wi-Fi to the same frame (subframe). In this case, the RE may deliver the paging message itself that is going to be transmitted through actual Wi-Fi, not the paging indication message of a unit of UE shown in the above example, to the WLAN AP. The RE may also notify the time when the corresponding paging message is to be transmitted to the WLAN AP.

However, since the Wi-Fi resource is occupied in CSMA/CA scheme, it is not guaranteed to transmit the paging message to a specific subframe within a specific frame like the cellular resource.

Accordingly, according to the present invention, information of a section (a) where a UE should monitor the paging message may be additionally provided.

Figure 12:
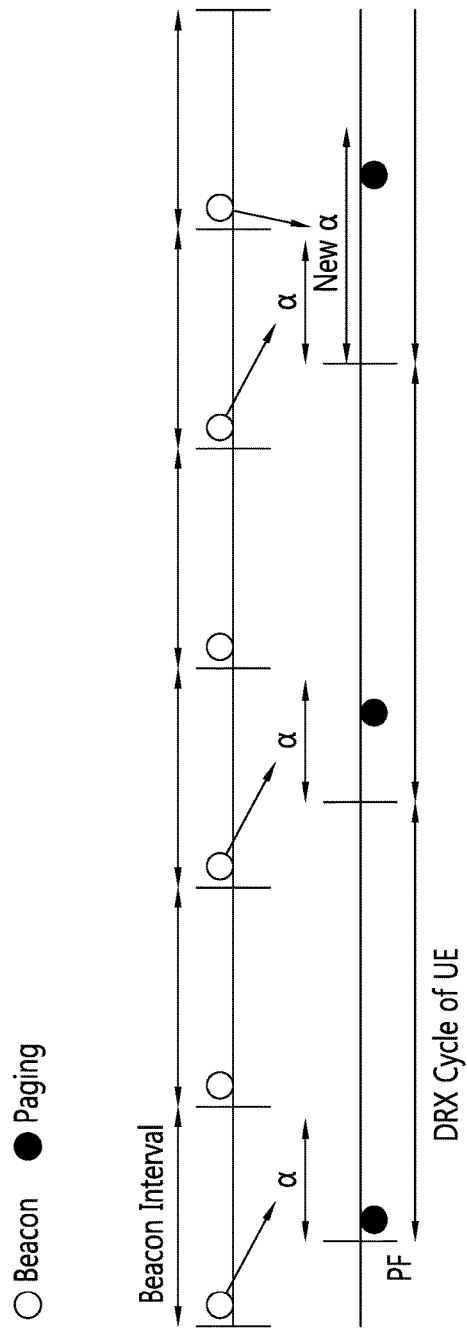
FIG. 12 is a diagram illustrating a beacon cycle and a paging message monitoring section transmitted to a UE.

FIG. 12 is a diagram illustrating a beacon cycle and a paging message monitoring section transmitted to a UE.

The monitoring section (a) is setup according to a load within a block started by symbol (BSS) that each WLAN AP manages. The load may be detected through a beacon, a probe, or an ANQP. In case of low load, the monitoring section may decrease, and in case of high load, the monitoring section may increase.

At the moment, the monitoring section may be explicitly transmitted to a UE through a beacon, a probe, or an ANQP, or determined by a predefined rule according to the load value.

The UE waits until the paging message that corresponds to itself is transmitted during the monitoring section at a specific point.

According to an example, the specific point may be setup as the same as those defined in the cellular scheme (a specific subframe in a specific frame), or may be transmitted to the UE by being newly defined by a BS or a WLAN AP that supports a cellular access, not by the existing scheme.

As shown in FIG. 12, according to an embodiment of the present invention, the monitoring section may be formed as a paging frame of UE, and the paging message is monitored during the monitoring section by being wake-up state in every discontinuous reception (DRX) of the UE. If the UE identity of its own is included in the paging message, the UE accesses to a network among the radio access network such as cellular, Wi-Fi, and so on. If the access RAT is included in the paging message, the UE access to the corresponding RAT. If the UE fails to receive the paging message or the UE identity of its own is not included in the paging message, the UE is changed to the wait state again.

If another alpha value is delivered through the sixth beacon before the alpha value section transmitted through the fifth beacon is terminated as shown in FIG. 12, the UE recalculate the monitoring section (ca) and monitors the paging message up to the recalculated section.

Figure 13:
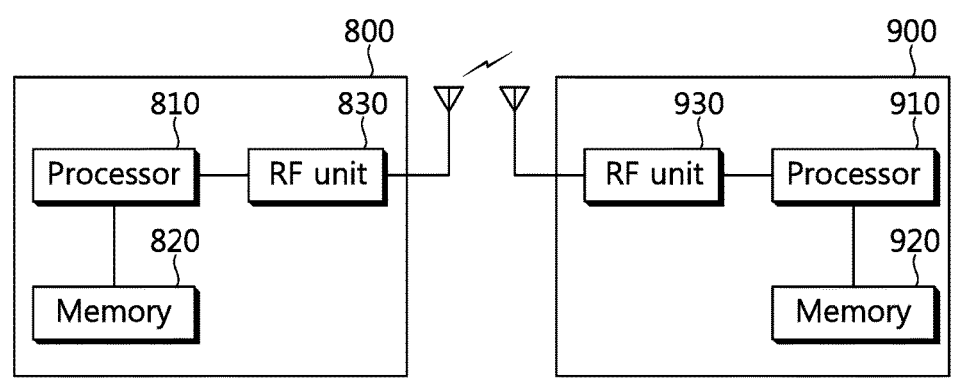
FIG. 13 is a block diagram illustrating a wireless communication system according to an embodiment of the present invention.

FIG. 13 is a block diagram illustrating a wireless communication system according to an embodiment of the present invention.

A BS 800 includes a processor 810, a memory 820, and an RF (radio frequency) unit 830. The processor 810 implements the proposed functions, procedure, and/or methods. The layers of radio interface protocol may be implemented by the processor 810. The memory 820 which is coupled to the processor 810 stores a variety of information for driving the processor 810. The RF unit 830 which is coupled to the processor 810 transmits and/or receives a radio signal. The BS 800 of FIG. 13 may include the cellular BS, the WLAN AP or the RE described above.

A UE 900 includes a processor 910, a memory 920, and an RF (radio frequency) unit 930. The processor 910 implements the proposed functions, procedure, and/or methods. The layers of radio interface protocol may be implemented by the processor 910. The memory 920 which is coupled to the processor 910 stores a variety of information for driving the processor 910. The RF unit 930 which is coupled to the processor 910 transmits and/or receives a radio signal. The UE 900 of FIG. 21 may include the multi-RAT UE described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

As such, the present invention provides a method and apparatus for determining an optimal wireless network by a UE when a radio access through wireless networks different from each other is available, and transmitting the TAU and the paging message using the determined network.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a tracking area update (TAU) by a user equipment (UE), the method comprising:
    receiving system information (SI) through a cellular interface from a multi-radio access technology radio entity (multi-RAT RE),
    wherein the SI includes a tracking area code (TAC) of the multi-RAT RE, and
    wherein the TAU is not performed through the cellular interface when a TAC of the UE is different from the TAC of the multi-RAT RE;
    receiving wireless local area network (WLAN) type information from an access point (AP);
    determining one of a first to third WLAN type on which the UE can perform the TAU based on the WLAN type information,
    wherein the WLAN type information for the first WLAN type includes information identifying whether the AP is physically collocated with the multi-RAT RE, wherein the WLAN type information for the second WLAN type includes information identifying whether the AP is physically connected to the multi-RAT RE, and wherein the WLAN type information for the third WLAN type includes information identifying whether the AP is physically collocated with the multi-RAT RE and physically connected to the multi-RAT RE; and
    performing the TAU through a WLAN interface based on the determined WLAN type.

2. The method of claim 1, further comprising:
    determining an optimal radio access interface based on a predetermined condition, when there exist a radio access network through the cellular interface and the WLAN interface,
    wherein the optimal radio access interface is determined to be a radio interface that has a larger cell coverage between the cellular interface and the WLAN interface, when a moving speed of the UE is higher than a predetermined value.

3. The method of claim 2,
    wherein,
    when connection management and mobility management of a core network are available to be performed based on the WLAN interface,
    the WLAN interface is determined to be the optimal radio access interface.

4. The method of claim 2,
    wherein,
    when a downlink coverage and an uplink coverage through the cellular interface are asymmetric,
    the WLAN interface is determined to be the optimal radio access interface.

5. The method of claim 2, wherein the optimal radio access interface is a radio interface through which a TAU was performed most recently.

6. A user equipment (UE) for transmitting a tracking area update (TAU), the UE comprising:
    a transmitter and a receiver; and
    a processor, operatively connected to the transmitter and the receiver, wherein the processor is configured to:
    receive system information (SI) through a cellular interface from a multi-radio access technology radio entity (multi-RAT RE),
    wherein the SI includes a tracking area code (TAC) of the multi-RAT RE, and
    wherein the TAU is not performed through the cellular interface when a TAC of the UE is different from the TAC of the multi-RAT RE;
    receive wireless local area network (WLAN) type information from an access point (AP);
    determine one of a first to third WLAN type on which the UE can perform the TAU based on the WLAN type information,
    wherein the WLAN type information for the first WLAN type includes information identifying whether the AP is physically collocated with the multi-RAT RE, wherein the WLAN type information for the second WLAN type includes information identifying whether the AP is physically connected to the multi-RAT RE, and wherein the WLAN type information for the third WLAN type includes information identifying whether the AP is physically collocated with the multi-RAT RE and physically connected to the multi-RAT RE; and
    perform the TAU through a WLAN interface based on the determined WLAN type.

7. The user equipment of claim 6, wherein the processor is further configured to:
    determine an optimal radio access interface based on a predetermined condition, when there exist a radio access network through the cellular interface and the WLAN interface,
    wherein the optimal radio access interface is determined to be a radio interface that has a larger cell coverage between the cellular interface and the WLAN interface, when a moving speed of the UE is higher than a predetermined value.

8. The user equipment of claim 7,
    wherein,
    when connection management and mobility management of a core network are available to be performed based on the WLAN interface,
    the WLAN interface is determined to be the optimal radio access interface.

9. The user equipment of claim 7, wherein the optimal radio access interface is a radio interface through which a TAU was performed most recently.

* * * * *